Nov. 8, 1960  W. S. MACDONALD ET AL  2,959,123
FIRING CONTROL MECHANISM FOR A DEPTH CHARGE
Filed Aug. 4, 1942  9 Sheets-Sheet 1

Inventors
W. S. MACDONALD
C. B. BROWN
R. H. PARK
S. J. SINDEBAND

By
Attorney

Nov. 8, 1960 W. S. MACDONALD ET AL 2,959,123
FIRING CONTROL MECHANISM FOR A DEPTH CHARGE
Filed Aug. 4, 1942 9 Sheets-Sheet 4

Inventors
W. S. MACDONALD
C. B. BROWN
R. H. PARK
S. J. SINDEBAND

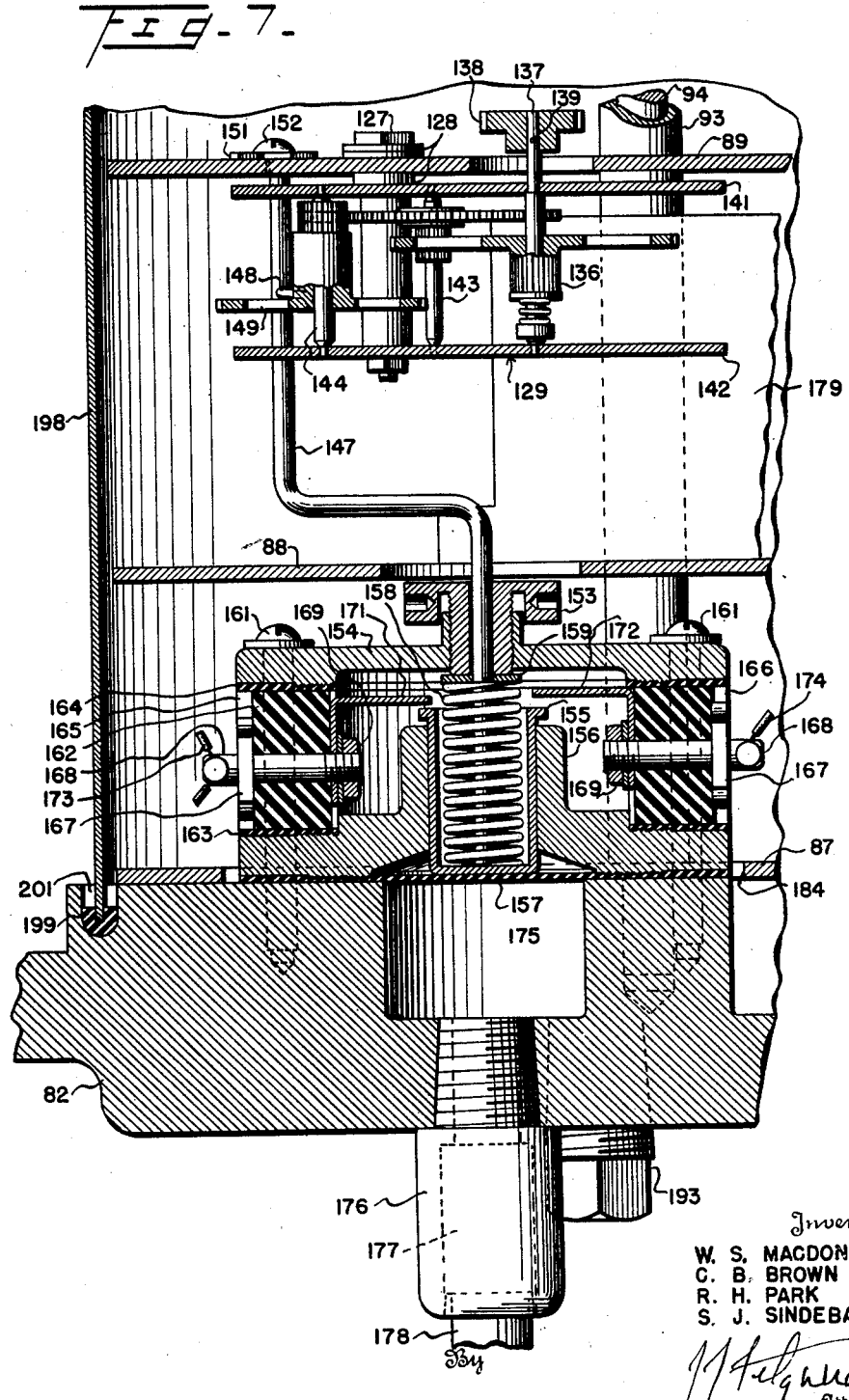

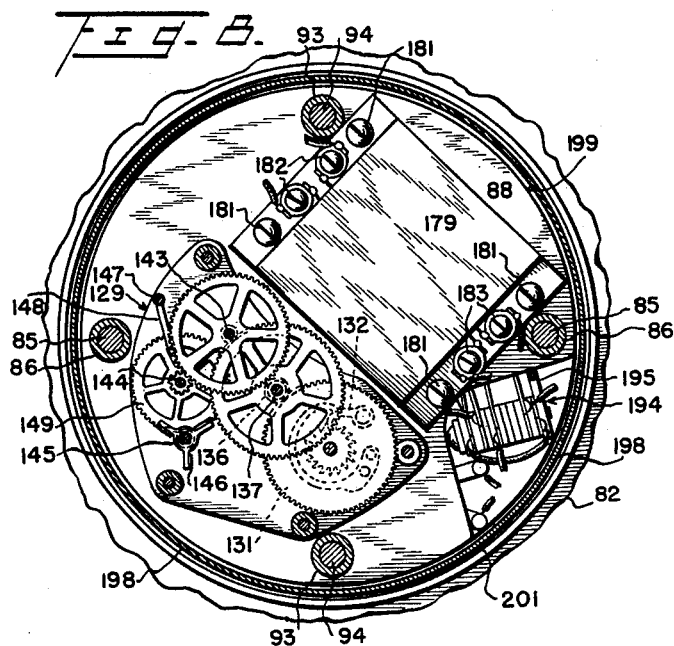
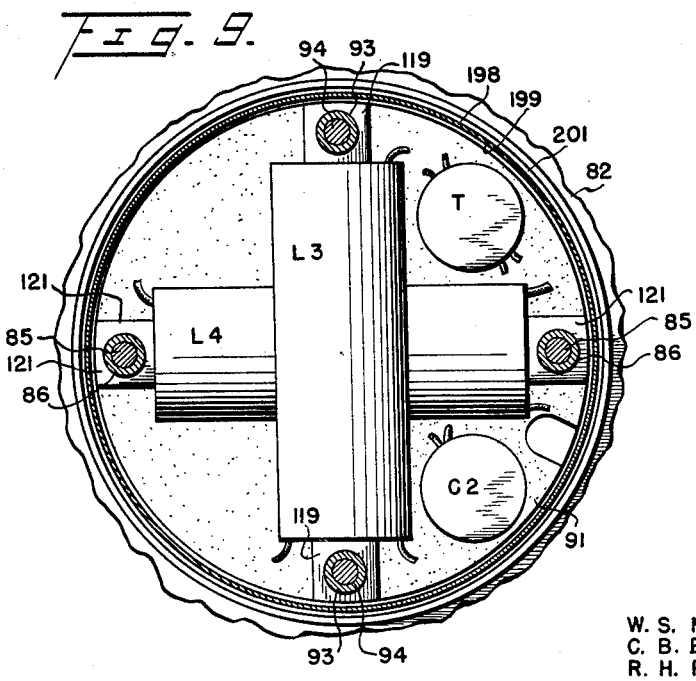

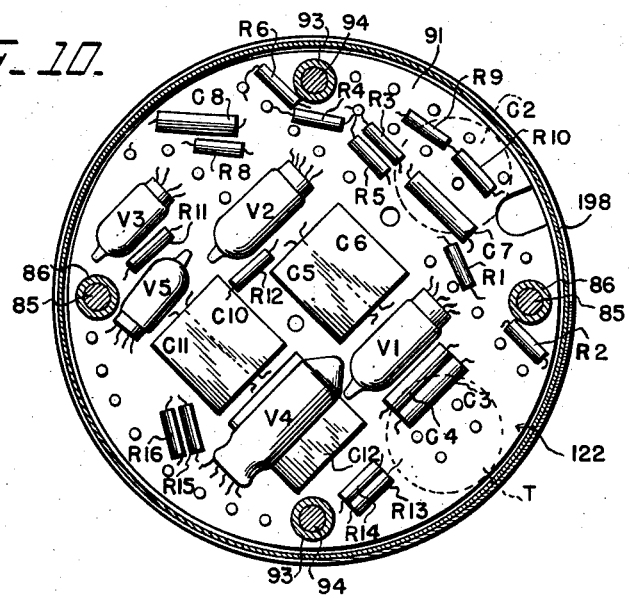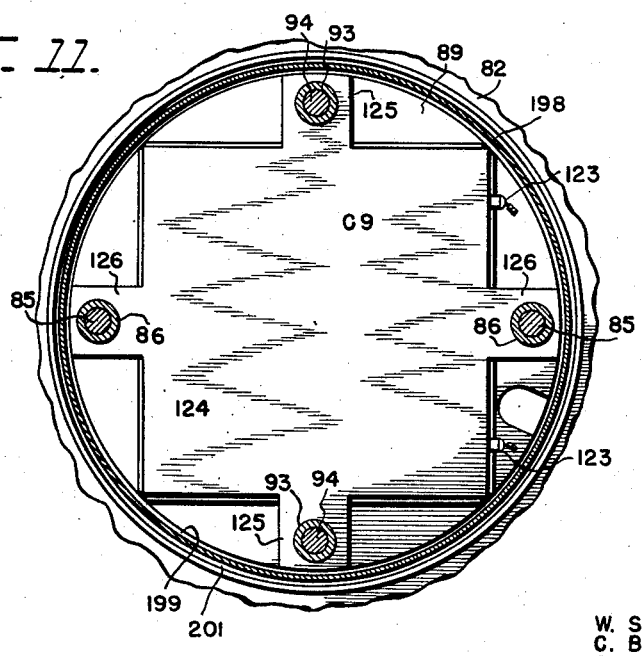

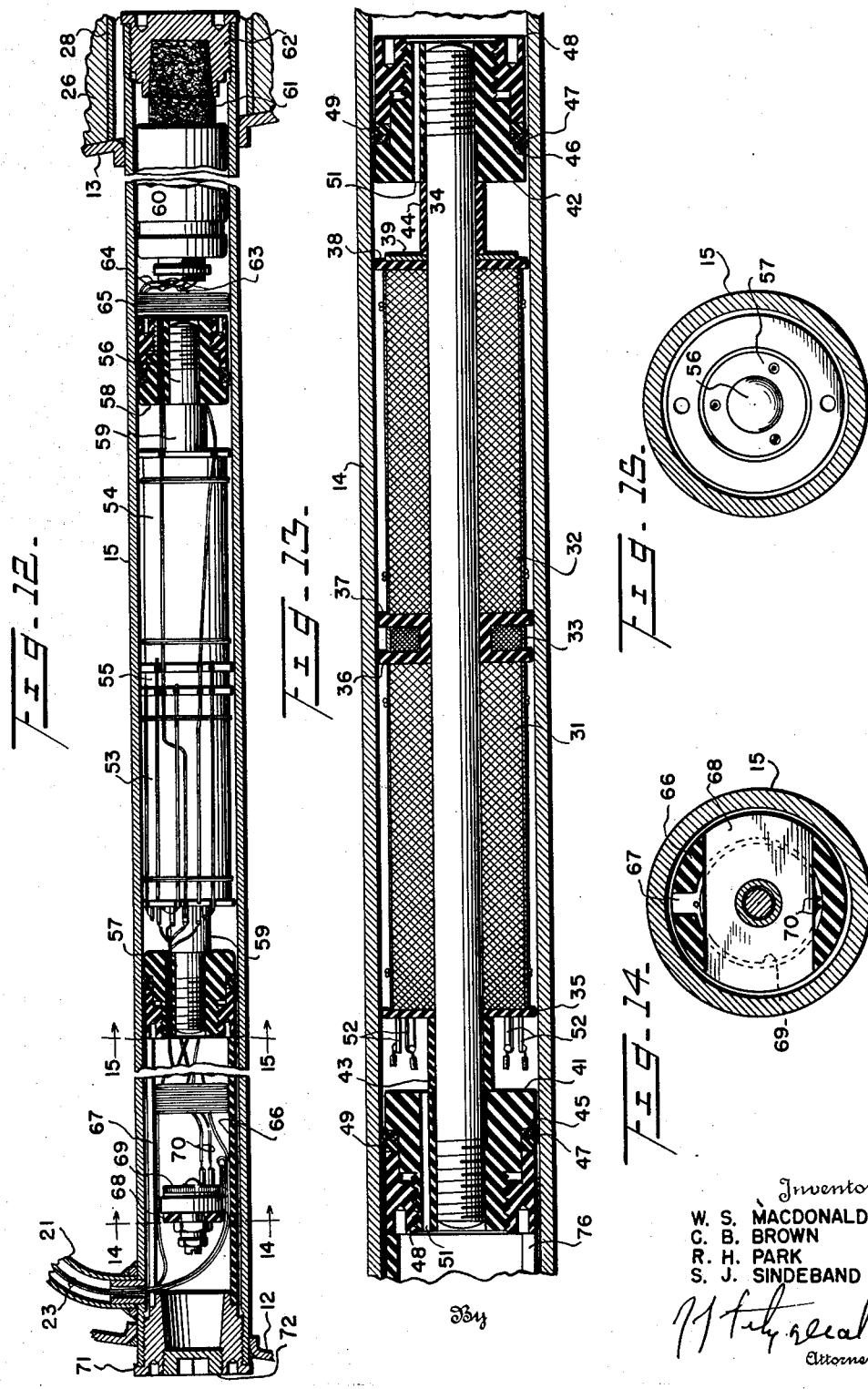

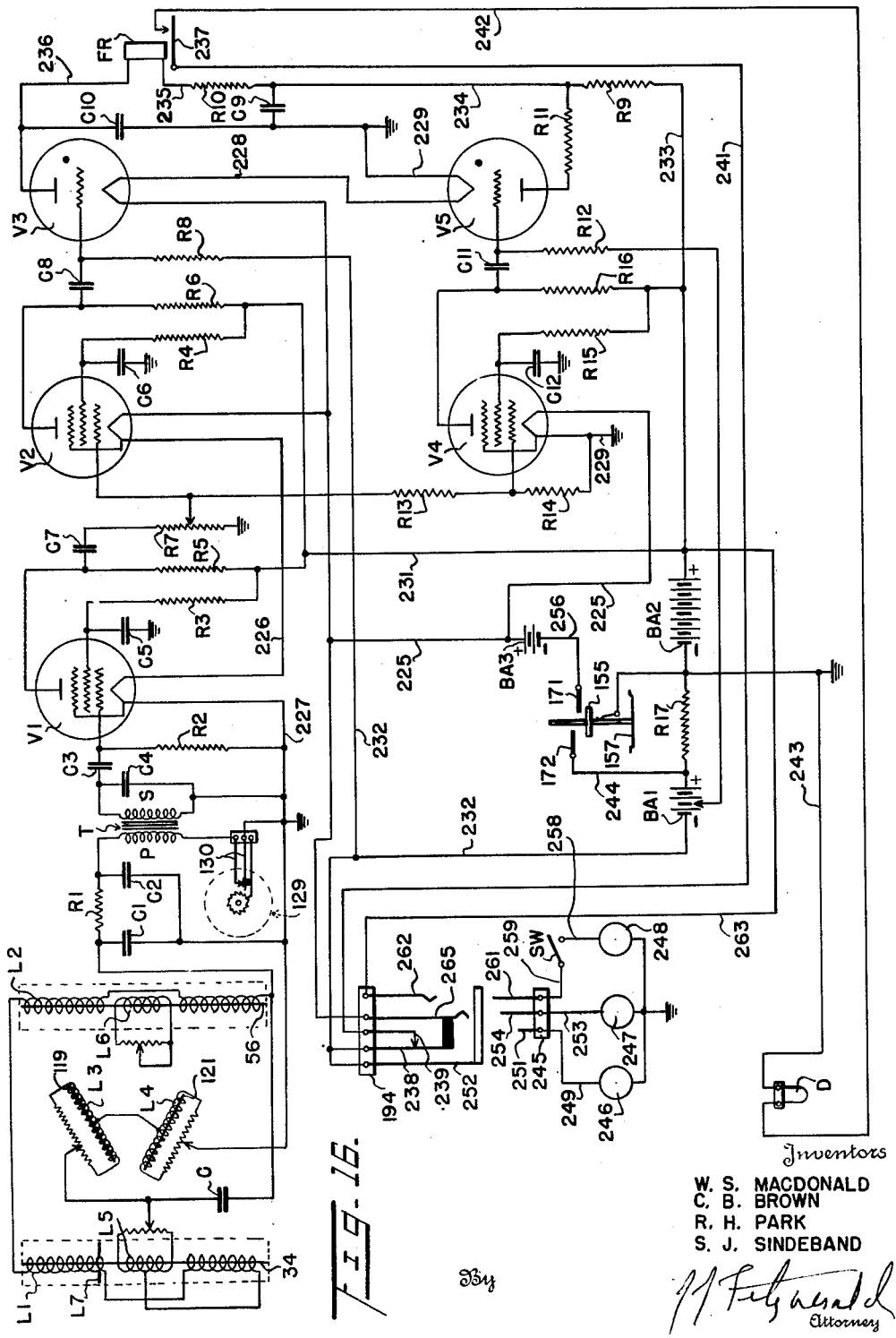

United States Patent Office 2,959,123
Patented Nov. 8, 1960

2,959,123

FIRING CONTROL MECHANISM FOR A DEPTH CHARGE

Waldron S. Macdonald, Westgate, and Charles B. Brown, Colmar Manor, Md., Robert H. Park, Pluckemin, N.J., and Seymour J. Sindeband, New York, N.Y. (All of Navy Yard, Washington, D.C.)

Filed Aug. 4, 1942, Ser. No. 453,550

18 Claims. (Cl. 102—7)

(Granted under Title 35, U.S. Code (1952), sec. 266)

This invention relates to firing control mechanisms for a depth charge. More specifically, the invention relates to a depth charge firing control mechanism controlled by the gradient of the magnetic field set up by a submarine and adapted to explode the depth charge in proximate relation with respect to the submarine regardless of the depth of submersion of the submarine within the water.

In devices heretofore proposed for firing a depth charge it is the usual practice to employ a firing mechanism controlled by the pressure of the water within which the depth charge is launched, the depth charge firing mechanism having been previously adjusted to fire the charge at a predetermined depth of submersion. By employing a considerable number of these depth charges set to fire at different depths of submergence, the probability of destroying a submarine is greatly increased. These types of depth charges possess the disadvantage of firing at a predetermined depth of submersion regardless of the depth of submersion of the submarine and thus there is a probability that a submarine, even though arranged substantially within the path of travel of a depth charge, may escape injury by reason of the explosion of the depth charge at a considerable vertical distance from the submarine. Other types of depth charges are provided with firing control devices adapted to explode the depth charge when a predetermined period of time has elapsed after the depth charge has been launched from an attacking craft. This type of depth charge also possesses the disadvantage of exploding at a predetermined depth of submersion within the water regardless of the depth of submersion of the target at which the depth charge is directed.

In the arrangement of the present invention the difference in the rate of change of the magnetic field detected by a pair of opposedly connected and balanced induction pickup coils arranged in predetermined space relation with respect to each other, hereinafter referred to as gradient coils, is employed to control a signal amplifying mechanism thereby to operate an electro-responsive device connected to the output of the signal amplifying mechanism and fire the depth charge when the difference in the signals received by each of the gradient coils has reached a predetermined order of magnitude. The presence of a large magnetic object such, for example, as a submarine within the earth's magnetic field causes the magnetic field within the vicinity of the submarine to be distorted and concentrated within the vicinity of the submarine. The movement of an induction pickup coil within this distorted and concentrated field causes an electromotive force to be generated by the pickup coil proportional to the rate of change in the number of lines of force of which the field is composed which are linked by the winding of the induction pickup coil. The magnetic field in which the lines of force thereof are of different degrees of concentration at different portions of the field is referred to herein as a gradient field and the signal generated by a pair of opposedly connected and balanced induction coils arranged in predetermined space relation with respect to each other, in response to movement of the coils within the gradient field, is referred to herein as a gradient signal. The rate of change in flux linkages between a pickup coil and the lines of force composing a gradient field increases as the coils move at a substantially uniform rate of travel within that portion of the field adjacent the magnetic mass.

The present invention contemplates the provision of a pair of gradient coils adapted to apply an input signal to an amplifying device variably in accordance with the gradient of the magnetic field with which the coils are linked as the coils are moved through the field. When the input signal to the amplifying device reaches a predetermined strength the depth charge is exploded, as will more clearly appear as the description proceeds, thereby providing an arrangement in which the depth charge is adapted to be fired opposite a submerged submarine and sufficiently close thereto to damage or destroy the submarine.

In the event that the submarine is not disposed within the zone of destruction of the depth charge during the downward movement thereof through the water, the explosion of the depth charge is delayed until the depth charge has reached a predetermined depth of submersion within the water whereupon the depth charge is adapted to be self-destructive in the event of missing the target. The firing control mechanism also includes means for preventing the premature detonation of the depth charge as the result of pressure impulses or vibrations received through the water caused, for example, by explosions of other depth charges during the travel of the depth charge downward within the water.

One of the objects of the present invention is the provision of new and improved means for firing a depth charge selectively in accordance with a predetermined gradient in the magnetic field within which the depth charge travels.

Another of the objects is the provision of a gradiometer detecting device adapted to fire a depth charge in which the premature firing of the depth charge as the result of movement of the depth charge in any direction within a uniform magnetic field is prevented.

Another object is to provide a depth charge adapted to be fired by gradient signals in which the signals are amplified by signal amplifying mechanism rendered active in response to the pressure of the water within which the depth charge is launched.

Another object is the provision of a depth charge control firing device in which signals of low frequency are modulated sufficiently to effect a control of the signal amplifying device and fire the depth charge when the modulated signals have reached a predetermined degree of strength.

Another of the objects is the provision of new and improved means for preventing the premature explosion of the depth charge as the result of countermining operations.

Another object is the provision of a depth charge firing control mechanism of the type adapted to be fired by gradient signals in which means are provided for testing the firing control mechanism prior to launching of the depth charge within the water without removing the firing control mechanism from the depth charge.

A further object is the provision of an improved firing mechanism for a depth charge which will be economical to manufacture, reliable in operation and which possesses all of the qualities of compactness, ruggedness and durability.

Still other objects, advantages and improvements will be apparent from the following description taken in connection with the accompanying drawings of which:

Fig. 7 is a greatly enlarged sectional view taken substantially along the line 7—7 of Fig. 5 and showing the impulse contact operating mechanism and starting means therefor;

Fig. 8 is a view taken substantially along the line 8—8 of Fig. 4;

Fig. 9 is a view taken along the line 9—9 of Fig. 4;

Fig. 10 is a view of the signal amplifying mechanism taken along the line 10—10 of Fig. 4 with the wiring and insulating plastic removed;

Fig. 11 is a view of one of the condensers employed with the signal amplifying mechanism taken along the line 11—11 of Fig. 4;

Fig. 12 is an enlarged detailed view partly in section and partly broken away of an arrangement of one of the induction pickup coils and balancing devices and mounting details therefor;

Fig. 13 is an enlarged detailed view in section of the balanced pickup coil employed with the arrangement of Fig. 12;

Fig. 14 is a view somewhat enlarged taken along the line 14—14 of Fig. 12;

Fig. 15 is a view somewhat enlarged taken along the line 15—15 of Fig. 12; and,

Fig. 16 illustrates diagrammatically the electrical circuit arrangement of the entire system.

Figure 1:
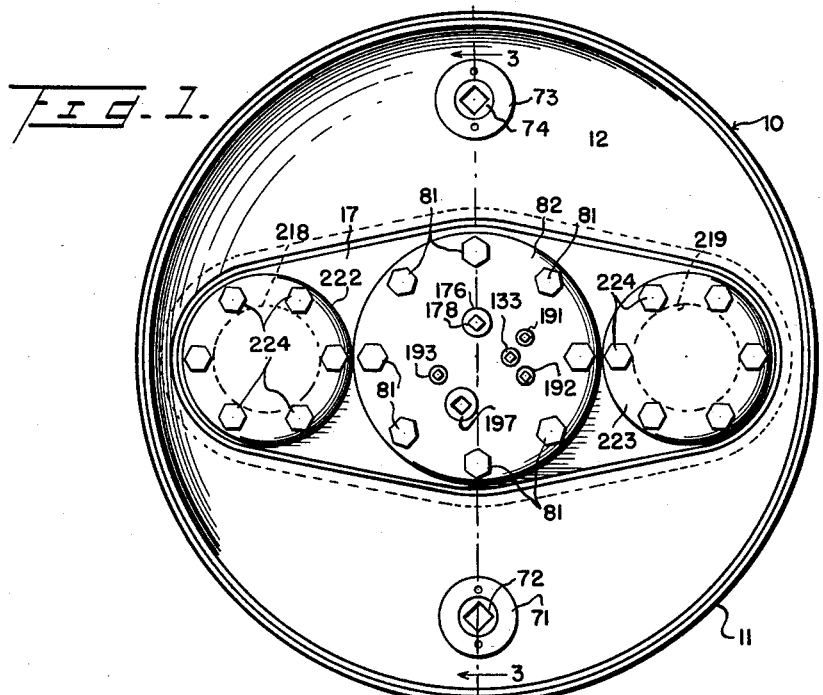
Fig. 1 is a front elevational view of a depth charge in accordance with a preferred embodiment of the invention.
Figure 2:
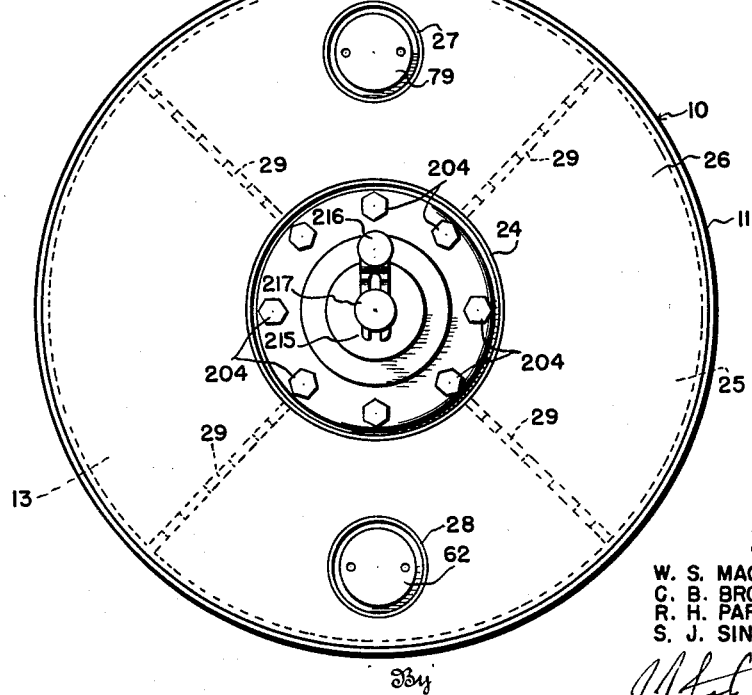
Fig. 2 is a rear elevational view of the device of Fig. 1.
Figure 3:
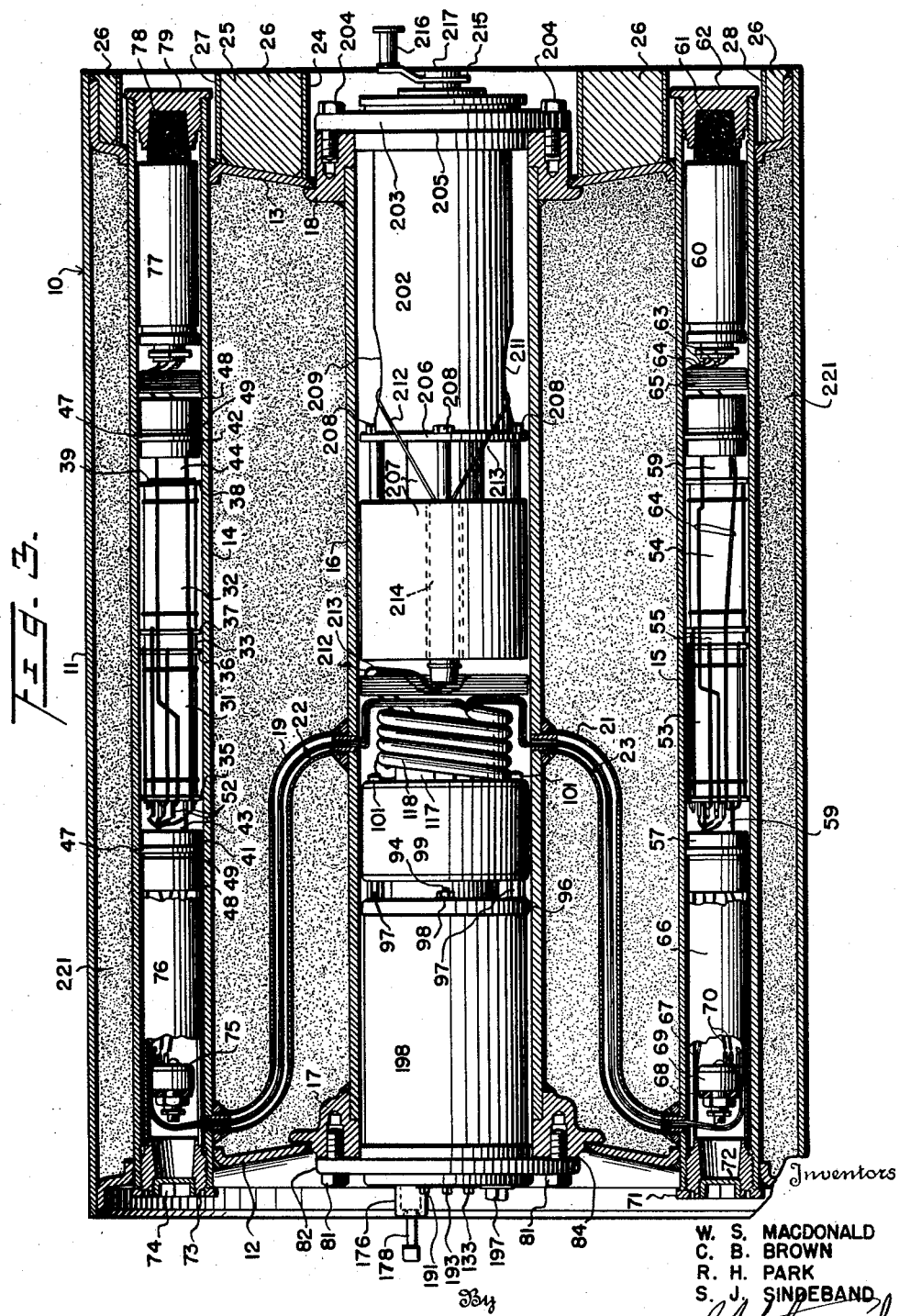
Fig. 3 is a sectional view somewhat enlarged and partly broken away taken substantially along the line 3—3 of Fig. 1.

Referring now to the drawings and more particularly to Figs. 1, 2 and 3 there is shown thereon a depth charge indicated generally by the numeral 10 comprising a cylindrical casing 11 having caps 12 and 13 secured to the ends thereof in any suitable manner as by welding the parts together. Supported by the end caps 12 and 13 are a pair of tubular members 14 and 15 arranged within suitable apertures formed within the end caps and sealed thereto as by welding the parts together. Within the tubular members 14 and 15 are arranged a pair of gradiometer coils and certain control devices therefor by means of which the gradiometer coils are balanced with respect to each other sufficiently to prevent the generation of an electrical signal thereby as the coils are moved rotatably in any direction within a uniform magnetic field.

Centrally arranged with respect to the casing 11 is a cylindrical supporting member 16 having flanged members 17 and 18 respectively secured to the ends thereof and extending within centrally arranged apertures within the caps 12 and 13 to which the flanged members are secured in any suitable manner as by welding the parts together. The cylindrical member 16 is provided with a pair of tubes or ducts 19 and 21 extending to the tubular members 14 and 15 respectively within which are arranged a plurality of conductors indicated generally by the numerals 22 and 23 for establishing an electrical connection between the gradiometer coils and control devices therefor and the signal amplifying mechanism arranged within the tubular member 16. The tubes 19 and 21 are maintained in the assembled position shown on Fig. 3 of the drawings in any suitable manner as by welding the tubes to the tubular members 14, 15 and 16.

The cap 13 is also provided with a circular partition or wall 24 surrounding the annular member 18 and the recessed portion 25 within the cap 13 adjacent thereto within which is arranged a mass of heavy material 26 such, for example, as lead thereby to increase the weight of the depth charge at the cap 13 thereof sufficiently to cause the depth charge to assume an upright position within the water such that the axis of the casing 11 is substantially vertical as the depth charge sinks within the water. A pair of tubular members 27 and 28 are secured to the cap 13 thereby to exclude the lead from the ends of the tubular members 14 and 15 respectively. The mass of lead, it will be understood, may be conveniently arranged within the recessed portion of the cap 13 while in a molten condition, the lead being retained therein in any suitable manner such, for example, as by providing the ribbed portions 29, Fig. 2, between the wall 24 and the outer portion of the cap 13, the ribbed portions having preferably a plurality of apertures or recessed portions therein adapted to receive the molten lead and prevent the leaden mass from being dislodged from the assembled position thereof with respect to the cap 13.

Within the tubular member 14 is arranged a pair of induction pickup coils 31 and 32, Figs. 3 and 13, hereinafter referred to as L1 and disposed on opposite sides of the induction coil 33 hereinafter referred to as L5. Each of the coils 31, 32 and 33 are arranged about a rod 34 of magnetic material suitable for the purpose such, for example, as a material known in the trade as 4–79 Permalloy having a composition of substantially 79 percent nickel, 4 percent molybdenum and 17 percent iron. The coils 31, 32 and 33 are maintained in predetermined space relation with respect to each other by reason of the provision of washers or spool heads 35, 36, 37 and 38 of suitable insulating material adapted to fit slideably within the tubular member 14. There is also assembled on the rod 34 a disk or washer 39, hereinafter referred to as L7 of material having a low ohmic resistance such, for example, as copper, the purpose of which will be more clearly apparent as the description proceeds. The ends of the rod 34 are threaded within a pair of members 41 and 42 adapted to clamp the coils 31, 32 and 33 in the assembled position by reason of the sleeve devices 43 and 44 arranged about the rod 34 and adapted to be engaged by the members 41 and 42. Each of the members 41 and 42 is provided with a shoulder 45 and 46 respectively in engagement with a pair of resilient bushings 47 of suitable insulating material adapted to clamp the members 41 and 42 yieldably to the tubular member 14 as the members 41 and 42 are tightened. An arrangement is thus provided in which the magnetic property of the rod is not altered in any way as the result of mechanical stresses imparted thereto by the mounting supports. A washer 49 is arranged preferably between each of the nuts 48 and the bushings 47. Each of the members 41 and 42 is provided preferably with an aperture 51 adapted to receive a plurality of electrical conductors whereby an external connection is established between the coils 31, 32 and 33 by way of the terminal connections 52 arranged on the spool head 35. The members 41 and 42, the bushings 47, nuts 48 and washers 49 are composed of suitable insulating material thereby to prevent the flow of eddy currents therein.

On Fig. 12 is shown arranged within the tubular member 15 a plurality of induction coils 53, 54 and 55, the coils 53 and 54 being hereinafter referred to as L2 and the coil 55 as L6, disposed on the magnetic bar 56 in a manner similar to the arrangement of the coils 31, 32 and 33 on the bar 34, the bar 56 being provided with members 57 and 58 in threaded engagement with the ends thereof for securing the bar yieldably to the tubular member 15 and insulating the bar therefrom generally in accordance with the arrangement disclosed for securing the bar 34 to the tubular member 14 and for clamping the coils together by reason of the tubular spacing members 59 arranged on the magnetic bar 56.

The tubular member 15 has arranged therein a condenser 60 hereinafter referred to as C1, damage or injury to the condenser during the transportation and planting of the depth charge being prevented by reason of the provision of a plug 61 of suitable resilient material such, for example, as felt arranged within a recessed portion of the cap 62 and extending therefrom into engagement with the end of the condenser 60. The cap 62 is preferably threaded into the end of the tubular member 15 after the condenser 60 has been inserted therein. The condenser 60 is also provided with a pair of terminal connectors 63 to which are secured as by soldering the parts together the conductors 64, sufficient slack in the conductors being provided as at 65 to facilitate the assembly of the condenser within the tubular member 15.

Within the other end of the tubular member 15 is arranged a sleeve member 66 of insulating material having a slotted portion 67 therein within which the conductors 23 are arranged thereby to facilitate the assembly of the sleeve member within the member 15. Secured to the inner portion of the sleeve member 66 in any suitable manner as by the mounting strip 68 fitted within complementary apertured portions of the member 66 is an adjustable resistor 69 connected as by the conductors 70 to the ends of the balancing coil 55, the sleeve member 66 being maintained in the assembled position by the cap member 71 threaded within the tubular member 15 and having an aperture therein normally closed by the threaded plug 72. An arrangement is thus provided in which, by removing the plug 72 and inserting a suitable adjusting tool into the aperture within the cap 71, the resistor element 69 may be adjusted at will without disassembling, or in any way interfering with the operation or arrangement of the balance control mechanism for the gradiometer coils.

In a similar manner the tubular member 14 is provided with a cap 73, Fig. 3, having a removable plug 74 therein whereby the variable resistor 75 employed for adjusting the balancing coil 33 may be set at will to any desired setting by removing the plug 74 from the cap. The adjustable resistor 75 is preferably secured to the sleeve member 76 generally in the manner of the resistor 69 and maintained in the assembled position within the member 14 by the cap 73. The tubular member 14 has arranged therein a cylindrical capacitor device 77 in abutting relation with respect to a plug 78 arranged within the cap 79 secured to one end of the tubular member 14. The capacitor elements 60 and 77 are herein referred to for the purpose of description as C1 and C respectively.

Figure 4:
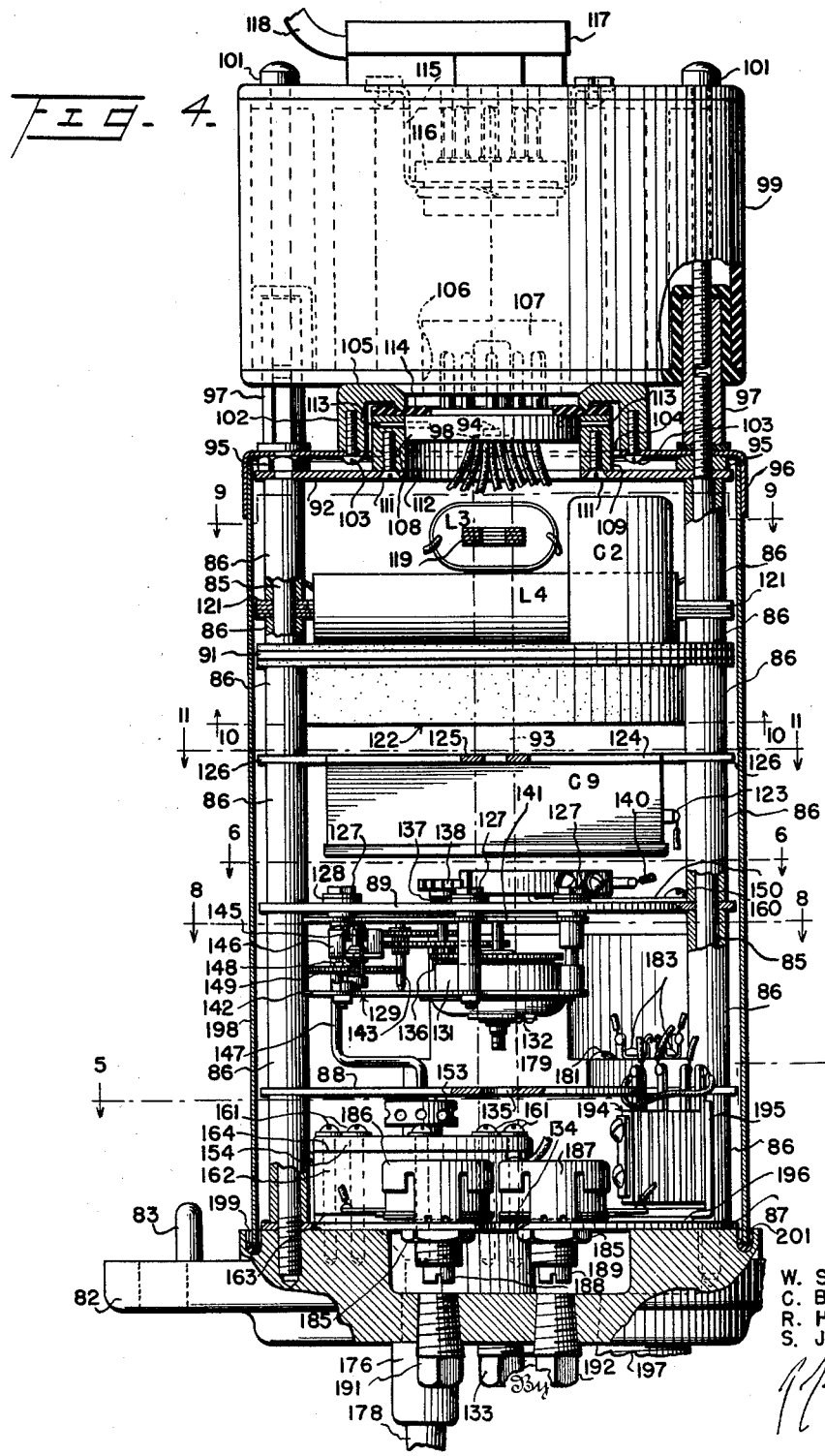
Fig. 4 is an enlarged view partly in section and partly broken away of the firing control mechanism of Fig. 3.
Figure 5:
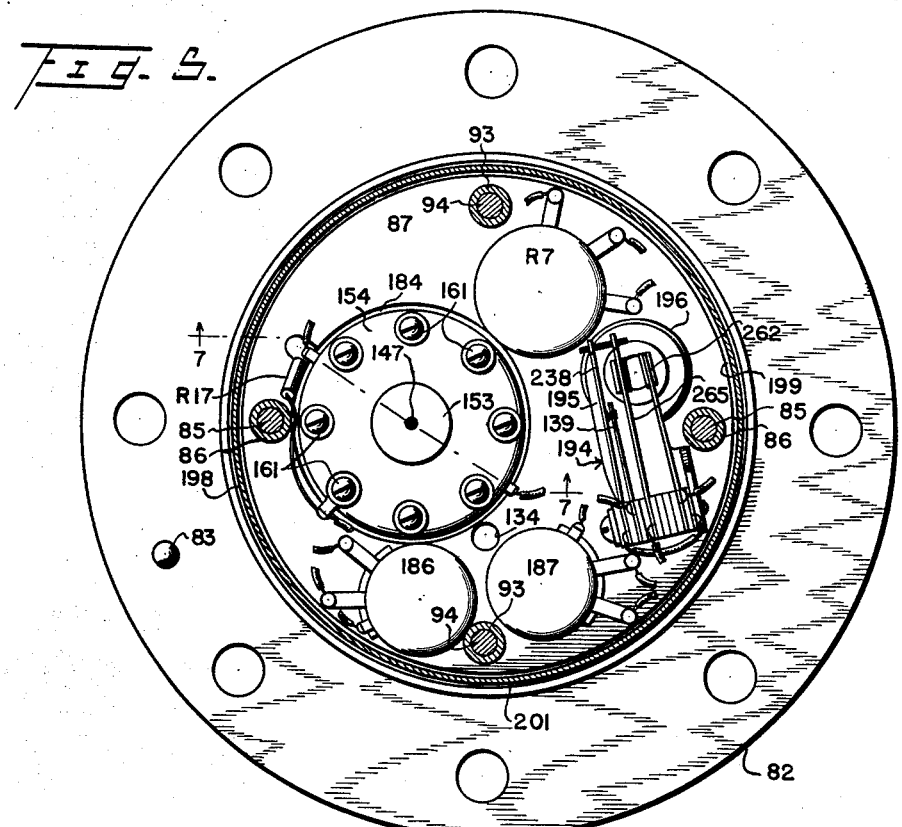
Fig. 5 is a sectional view taken substantially along the line 5—5 of Fig. 4.

Secured to the annular member 17 as by the bolts 81 is a supporting member or collar 82 having a dowel pin 83, Fig. 4, preferably secured thereto for bringing the supporting member into predetermined assembled position with respect to the casing of the depth charge. A suitable gasket 84, Fig. 3, is preferably arranged between the flanged member and the annular member 17 thereby to provide a watertight connection therebetween. Secured to the flanged portion 85 are a pair of threaded studs 85 having a plurality of spacing members or sleeves indicated generally by the numeral 86 thereon adapted to support the plates 87, 88, 89, 91 and 92, the plates being additionally supported by a plurality of sleeves or spacing members indicated generally by the numeral 93, Fig. 11, arranged on the studs or rods 94, the rods 85 and 94 being provided with a plurality of nuts 95 adapted to clamp the plates securely in the manner indicated. A suitable cap 96 is maintained in abutting relation with the nuts 95 and clamped thereto by the threaded extension members 97 and nuts 98 arranged on the rods 85 and 94 respectively. The extension members 97 are adapted to fit within complementary recessed portions of the battery case 99 and be secured thereto as by the screws 101 in the manner illustrated.

The cap 96 is provided with an annular member 102 secured thereto as by the screws 103 in alinement with a centrally arranged aperture 104 therein. The member 102 is provided with a surface 105 adapted to support the battery case as the battery is clamped thereagainst by the screws 101. The battery case is provided with an aperture 106 within which is arranged a jack connector 107 having a plurality of contact elements adapted to be engaged by the prongs of the plug 108 thereby to establish an electrical connection between the mine firing control mechanism, the source of electrical power and the gradiometer coils. The plug 108 is supported by the ring 109 secured to the plate 92 as by the screws 111 in alinement with the aperture 112 within the plate. A satisfactory means of securing the plug 108 to the ring 109 is by employing a plurality of pins or screws 113 in the manner illustrated. A thrust washer or gasket 114 preferably of resilient material is provided between the member 102 and the ring 109 to seal the plug 108 to the member 102.

The battery case 99 is provided with a plurality of dry cells having circuit connections therebetween by means of which the various electrical potentials of the tubes and the electrical energy required for the operation of the firing control mechanism and detonating device are obtained. There is also provided within the recessed portion 106 of the battery case a cup-shaped bracket 115 by means of which the multi-prong plug 116 is secured to the casing. The plug 116 is provided with a plurality of terminal connections, as will be readily understood, having a plurality of electrical conductors secured thereto by means of which the prongs of plug 116 are in electrical connection with certain of the contact elements of the jack 107 and with the source of electrical power. There is also provided an electrical connector 117 adapted to engage the prongs of the plug 116 thereby to establish an external circuit connection to the plug 116 by way of conductors through the cable 118 secured to the connector 117. Intermediate the plates 91 and 92 are arranged a pair of balancing coils L3 and L4, each of the coils comprising a winding arranged about the cores 119 and 121 respectively. The core 119 comprises a plurality of laminations of magnetic material suitable for the purpose such, for example, as iron or Permalloy having an aperture at each end portion thereof within which is arranged the rods 94, the core being maintained in predetermined space relation by the spacing members 93 arranged about the rods 94 intermediate the core and the plates 91 and 92.

The coil L4 is arranged about and supported by the core 121 of magnetic material preferably laminated in construction and having apertures at the end portions thereof adapted to receive the rods 85, the core being securely maintained in predetermined space relation with respect to the core 119 by reason of the provision of suitable spacing members 86 arranged intermediate the core 121 and the plates 91 and 92. An arrangement is thus provided in which the coils L3 and L4 are arranged at right angles to each other and in predetermined space relation with respect to the pickup coils L1 and L2 by reason of the dowel pin 83 secured to the member 82, the coils L3 and L4 being thus adapted to be adjusted by suitable resistance devices connected thereto thereby to effect a balance between the pickup coils L1 and L2. Secured to the plate 91 in any suitable manner is a condenser C2 and transformer T, Fig. 9, to which the induction pickup and compensating coils are connected, the circuit arrangement being shown diagrammatically on Fig. 16.

There is also secured to the plate 91 at the lower side thereof a signal amplifier indicated generally by the numeral 122 comprising a pair of vacuum amplifying tubes V1 and V2 and a hot cathode type of tube V3 adapted to amplify the signals received from the transformer T and operate a firing relay when the signals have reached a predetermined degree of strength. On the plate 91 there is also arranged a countermining device comprising a signal amplifying tube V4 of the vacuum type and a hot cathode tube V5 adapted to be controlled thereby. The control tube V4 is adapted to have the control elements thereof set into vibration by a shock or impulse received through the water such, for example, as may be caused by the explosion of another depth charge within the vicinity of the device thereby to fire the tube V5 and prevent the operation of the firing relay as will more clearly appear as the description proceeds. The grid control element of tube V4 is also operatively connected to the plate circuit of the tube V1 whereby the tube V5 is adapted to be fired by certain types of signals received from the pickup coils L1 and L2, the balancing coils L3, L4, L5 and L6, and any of the associated control elements which may be set into vibration as the result of impulses of pressure or shock through the water within which the depth charge is planted. The signal amplifier 122 also includes a plurality of capacitors and resistance elements arranged in any suitable manner on the plate 91 such, for example, as the arrangement shown on Fig. 10 of the drawings in which the various elements and instrumentalities employed in the amplifier structure are shown in their respective positions upon the plate 91, the wiring between the various elements of the structure being broken away thereby more clearly to show the different parts of the structure. Certain of the devices shown on Fig. 10 are supported by the electrical conductors connected thereto, as is well known in the electrical art, thereby providing a structure which is economical to manufacture and in which standard elements may be employed. After the various circuit connections have been completed, the entire amplifying structure may be immersed in molten wax, preferably of the type known in the trade as halowax thereby to prevent injury to the parts and the wiring and electrical connections therebetween during the assembly, testing, transportation and planting of the depth charge within the water.

The plate 91, may, if desired, be provided with a plurality of terminals and apertures therein within which the various electrical conductors may be arranged without the possibility of the wiring extending beyond the outline of the plate 91.

A condenser C9, Figs. 4 and 11, is arranged between the plates 89 and 91 having a pair of terminals 123 thereon adapted for external electrical connection by means of the electrical conductors connected thereto. The condenser is provided preferably with a plate or base 124 with projecting arms 125 and 126 having an aperture therein for engagement with the rods 94 and 85 respectively, the condenser being maintained in the position shown on the drawings by reason of the spacing members arranged on the studs 85 and 94.

Figure 6:
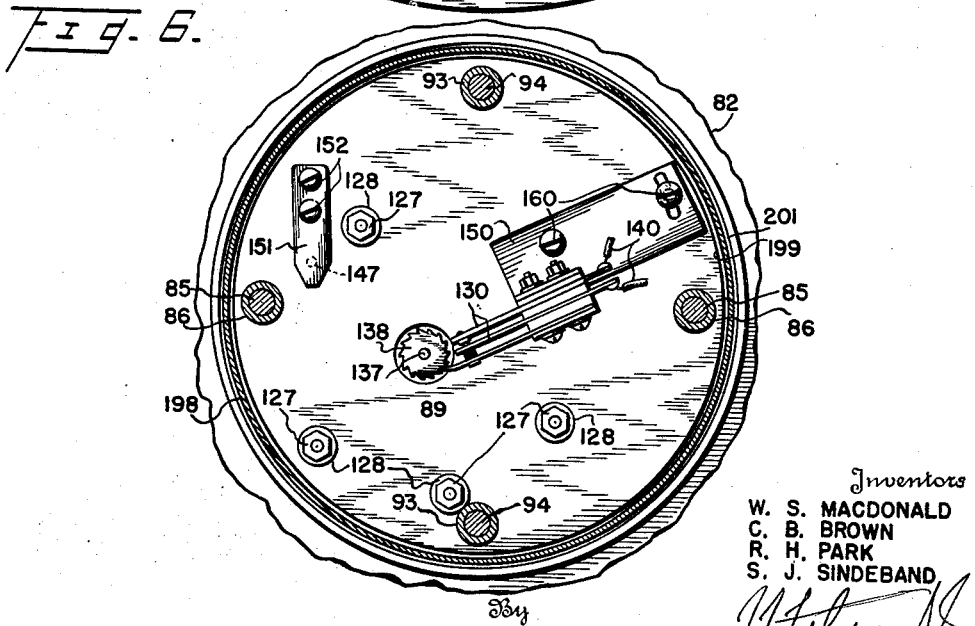
Fig. 6 is a view taken along the line 6—6 of Fig. 4.

Secured to the plate 89 as by the nuts 127 and electrically insulated therefrom as by the washer 128 of any suitable insulating material, is a spring driven escapement mechanism indicated generally by the numeral 129. The mechanism includes a spring motor 131 having a ratchet member 132 thereon whereby the spring is adapted to be wound by a key or crank inserted within the cap 82 after the plug 133, Figs. 1 and 3, has been removed, the key or crank also extending through the apertures 134 and 135 within the plates 87 and 88 respectively. When the spring motor has been wound sufficiently, the plug 133 is replaced within the cap 82 thereby to exclude water from the interior of the device after the device has been planted. The spring motor is in meshed engagement with the gear 136 arranged on the shaft 137 having a notched cam member 138 secured thereto as by the pin 139, the spring motor and shaft 137 being journaled within the plates 141 and 142, the plates also supporting the geared shafts 143, 144 and 145. On shaft 145 is mounted an air impeller 146 adapted to retard and control the speed of rotation of the cam member 138 during the descent of the depth charge within the water. The cam member 138 is adapted to cause the contact springs 130 to be repeatedly disengaged at predetermined intervals of time during the operation of the cam 138 thereby to interrupt a circuit including the conductors 140 secured thereto. The contact spring assembly is secured to the plate 89 by a suitable mounting support 150 and the screws 160, a slot such as the slot illustrated on Fig. 6 being preferably provided within the mounting support within which one of the screws 160 is arranged thereby to enable the contact springs 130 to be adjusted with respect to the cam member 138.

There is also provided a plunger or rod 147 adapted to slide within the plates 141, 142 and 89 and having a pin 148 adapted to engage the gear 149 secured to the shaft 144 as the plunger is urged downward by the spring 151 secured to the plate 89 as by the screws 152. The lower end of the rod 147 is offset with respect to the upper portion of the rod and parallel thereto, the lower end passing through an adjustable nut 153 fitted within the plate 154 and adapted to be moved upward by the cup-shaped member 155 slideably supported within the member 156. The cup-shaped member 155 is normally urged against a flexible diaphragm 157 by a spring 158 disposed about the rod 147 and adapted to be adjusted at will by the nut 153, a washer 159 being arranged preferably between the spring and the adjusting nut. An arrangement is thus provided in which the clock mechanism is adapted to be released in accordance with a predetermined degree of pressure of the water against the diaphragm 157 corresponding to a predetermined depth of submersion of the depth charge within the water controlled by the setting of the nut 153. The flexible diaphragm 157 is securely clamped between the member 156 and the cap 82 by the screws 161, the screws passing through an annular member 162 of suitable insulating material such, for example, as hard rubber, Bakelite or the like and through the gaskets 163 and 164 of insulating material.

The annular member 162 is provided with slots 165 and 166 adapted to coact with the complementary flattened portions on the head 167 of the clamping screws 168 and prevent rotation of the clamping screws as the nuts 169 threaded thereon are tightened. Secured between the nuts 169 and the annular member 162 is a pair of contact springs 171 and 172 adapted to be engaged in succession by the cup-shaped contact member 155 thereby establishing a circuit connection between the conductors 173 and 174 secured to the clamping screws 168. The arrangement comprises a starting switch adapted to set the signal amplifier and anti-countermine device in operation as the hydrostat operates, the hydrostat element also setting the escapement mechanism 129 into operation by reason of the plunger rod 147 extending therebetween. The lower side of the flexible diaphragm 157 is sealed to a chamber 175 formed within the cap 82 and normally closed by the plug member 176 threaded within the cap 82. The plug 176 is provided with a recessed portion 177 sealed by the projecting pin 178 soldered thereto and adapted to be disengaged from the plug by striking against a portion of the launching mechanism as the depth charge is launched thereby exposing the chamber 175 and the flexible diaphragm 157 to the pressure of the water as the depth charge passes beneath the surface of the water.

On the plate 88 is secured a firing relay 179 as by the screws 181, the relay being hereinafter referred to as FR. The relay may be of any type suitable for the purpose in which a pair of normally open contacts are adapted to be engaged in response to energization of the winding of the electromagnet thereof. In the specific embodiment of the invention disclosed on Figs. 4 and 8, the relay is shown as being enclosed within a casing of suitable insulating material having screw terminals 182 and 183 thereon by means of which an external circuit is adapted to be extended to the electromagnet and relay contacts.

The plate 87 is maintained in clamped engagement with the upper surface of the cap 82 by the studs 85 and 94 and spacing members 86 and 93 thereon and provided with an aperture 184, Fig. 7, within which the flexible diaphragm 157 and member 156 are arranged. Secured to the plate 87 as by the nuts 185 are a pair of variable resistance devices 186 and 187 for controlling the adjustment of the compensating coils L3 and L4. Each of the resistance devices comprises a slotted adjustable element 188 extending within a recess 189 within the cap 82. A pair of plugs 191 and 192 are threaded within the cap 82 in alinement with the adjustable members 188 thereby providing an arrangement in which the resistance devices 186 and 187 may be set to a desired setting by employing a suitable adjusting tool inserted within the apertures of the cap 82 and the plugs 191 and 192 have been removed therefrom. It will, of course, be understood that the plugs 191 and 192 are threaded into the assembled position within the cap 82 after the aforesaid adjustments have been made thereby to exclude water from the interior of the firing control mechanism as the depth charge sinks within the water.

There is also secured to the plate 87 a resistance unit R7 having an adjustable element in substantial alinement with the plug 193, Fig. 7, threaded within the cap 82 whereby the amplification of the amplifying device may be varied in accordance with the setting of the variable resistor R7 by employing an adjusting tool inserted within the cap 82 after the plug 193 has been removed. The plug 193, it will be understood, is employed to exclude water from the interior of the firing control mechanism after the depth charge has been launched.

There is also provided on the plate 87 a test jack 194 secured thereto as by the bracket 195, a washer 196 of suitable insulating material being arranged between the bracket and the plate 87 to insulate the jack from the plate electrically. A plug 197 is threaded within the cap 82 in alinement with the jack 194 whereby a test plug may be inserted into the jack after the plug 197 has been removed from the cap and the batteries employed with the signal amplifying unit and anti-countermine device may be tested prior to the launching of the depth charge within the water without disassembling the firing control mechanism or interfering in any way with the associated circuits and devices connected thereto. The jack 194 is of any well known type in which contact elements are adapted to be brought into engagement with the tip, ring and sleeve elements respectively of a test plug inserted therein.

The firing control mechanism comprising the signal amplifier, firing relay, balancing coils L3 and L4 and associated control resistance elements, the impulse mechanism and starting means therefor, and the test jack are enclosed by a cylindrical member 198 secured in any suitable manner to the cap 96 and adapted to engage at the lower edge thereof a resilient gasket 199 of material suitable for the purpose such, for example, as rubber arranged within the annular recessed portion 201 of the cap 82 thereby additionally to safeguard the firing control mechanism from physical damage or from the effects of moisture during the assembly, transportation and planting of the device.

There is also provided within the cylindrical member 16 a casing 202 comprising a flanged member 203 secured to the annular member 18 as by the bolts 204, a gasket 205 preferably being arranged between the members 18 and 203 to prevent the leakage or seepage of water therebetween. The casing 202 is provided with a collar 206 to which is secured the casing 207 within which is arranged an explosive charge, the bolts 208 being employed to maintain the casing 207 in the assembled position shown on the drawing. The casing 202 is provided with apertures 209 and 211 within which are arranged the conductors 212 and 213 respectively, the conductors also passing through a conduit or tube 214 within the casing 207 thereby to establish a circuit connection from the firing relay to a detonating device arranged within the casing 202. The detonating device is preferably of the type adapted to be brought into operative relation with respect to the explosive charge arranged within the casing 207 in response to the operation of the hydrostat device, as is well known in the art to which the present invention pertains, the premature operation of the hydrostat being prevented by a fork member 215 having a projecting portion 216 thereon adapted to be brought into engagement with a fixed member on the launching apparatus employed with the depth charge thereby to cause the fork member 215 to be disengaged from the plunger 217 with which the fork member 215 is normally engaged. When this occurs plunger 217 is unlocked and thereby adapted to respond to the pressure of the water within which the depth charge is immersed, the member 215 effectively preventing movement of the hydrostat element and detonating device connected thereto prior to the launching of the depth charge.

Whereas in the illustrative embodiment of the invention shown on Fig. 3 a particular form of structure of the depth charge exploding mechanism is shown, it will be understood that this is by way of illustration only as various other forms of explosive chambers and detonating devices therefor adapted to be brought into operative relation with an explosive charge in response to the pressure of the water within which the device is planted may be employed without departing from the spirit and scope of the present invention and the specific form of explosive device and hydrostatically controlled means for inserting the detonating element within the explosive charge form no part of the present invention. Furthermore, if desired, the detonating device may be of the type adapted to require the explosion of a percussion cap when the pressure of the water against a hydrostat element operatively connected thereto has been increased to a predetermined order of magnitude in the event that the path of travel of the depth charge within the water is not sufficiently near the submarine to cause the depth charge to be exploded by signals received from the gradiometer coils L1 and L2. It will also be understood that in any of the well known devices suitable for the purpose in which the depth of submersion at which the percussion cap is exploded by the hydrostat device may be set at will, means may be provided for adjusting the depth at which the percussion cap is exploded but such adjusting means forms no part of the present invention.

The member 17 is provided with two additional apertures 218 and 219, Fig. 1, into which an explosive charge 221 is introduced within the casing 11, the apertures being adapted to be sealed by the caps 222 and 223 respectively, the caps being securely clamped to the member 17 by the bolts 224. Preferably, though not necessarily, a suitable gasket may be employed between the caps 222 and 223 and the member 17 to insure a watertight connection therebetween.

The operation of the depth charge will now be described. Let it be assumed, by way of example, that the depth charge has been released from an attacking craft such that the path of travel of the depth charge within the water is sufficiently close to cause the submarine to be destroyed by the explosion of the depth charge. As the depth charge rolls along the launching track of the attacking craft, the pin 178 strikes against a projecting portion of the track thereby disengaging the pin from the plug 176 and thus allowing the passage of water within the chamber 175, Fig. 7, as the depth charge enters the water. The fork member 215 is also torn loose from the plunger 217 by projecting portion 216 thereof engaging a fixed member arranged on the opposite side of the depth charge track thereby releasing for operation the hydrostat associated with the plunger 217. As the depth charge enters the water the casing 11 thereof assumes a vertical position by reason of the mass of lead 26 arranged within the cap 13 of the depth charge and continues to sink within the water in a vertical line substantially coincident with the axis of the casing 11. When the depth charge has sunk to a predetermined depth of submersion such for example, as fifty feet beneath the surface of the water the flexible diaphragm 157, Fig. 7, is forced inward by the pressure of the water sufficiently to compress the spring 158 and cause the rod 147 to be moved sufficiently for the pin 148 thereof to be disengaged from the gear 149 and release the escapement mechanism 129. The cam member 138 is thus caused to rotate by the spring motor 131 and the contact springs 130 are thus caused to be brought into electrical engagement with each other periodically at predetermined intervals of time during the descent of the depth charge within the water.

As the depth charge moves within the vicinity of the submerged submarine the signals generated by each of the pickup coils L1 and L2 are different in strength by reason of the difference in the rate of change of the lines of force composing the magnetic field linked by each of the coils and the gradient signal picked up by the coils L1 and L2 is, therefore, of very low frequency, the strength of gradient signal at any instant being proportional to the difference in the electromotive forces generated by each of the coils L1 and L2. The output signal from the gradiometer coils L1 and L2 is applied to the condenser C2 and thence periodically to the primary winding of transformer T by way of the contact springs 130 thereby providing an arrangement in which low frequency signals are converted to voltage impulses of considerably higher frequency adapted to be amplified by the vacuum tube amplifier of the type disclosed which has a relatively low stabilizing time. By modulating the input signal to impulses of considerably higher frequency an amplifying structure may be employed which possesses the advantage of being composed of relatively small elements.

The sensing mechanism employed to detect the gradient within the magnetic field through which the depth charge travels comprises a pair of induction pickup coils L1 and L2 arranged such that the voltage generated by each of the coils is balanced by the voltage generated by the other coils as the coils are moved within a uniform magnetic field. This balanced condition is obtained by the pickup coils L3, L4 and the balancing coils L5 and L6 connected in the manner shown on Fig. 16. The coils L3 and L4, it will be recalled, are arranged intermediate the coils L1 and L2 and at right angles to each other and are connected in such a manner that the voltage generated by the coils L3 and L4 opposes the resultant unbalanced voltage generated by the pickup coils L1 and L2 when the gradiometer is moved angularly within a uniform magnetic field. The balancing coil L5 is connected to the coil L1 in the manner shown on the drawing and is employed to adjust the voltage generated by the pickup coil L1 into matching relation with the voltage generated by the pickup coil L2 when the gradiometer is rotated within a uniform magnetic field. The balancing coil L6 is employed to generate an eddy current field variably in accordance with the setting of the resistor element bridged thereacross sufficient to balance the eddy current field set up within the magnetic cores of the induction coils L1 and L2 and within the surrounding metallic masses. The coil L7 comprising a single short-circuited turn arranged about the core 34 of the induction pickup coil L1 produces an eddy current field sufficient to alter the eddy current ratio between the pickup coils L1 and L2 such that when the variable resistor shunting the balance coil L6 is set to the mid position thereof, the normal gradiometer eddy currents set up by the changing fields traversing the gradiometer structure generate voltages which are equal and opposite in character. An arrangement is thus provided in which the adjustment of the resistor shunting the balancing coil L6 in either direction from the mid position thereof is employed to vary the eddy currents flowing within the coil L6.

The detecting circuit includes a pair of filter condensers C and C1 connected in the manner shown in the drawing, and the condenser C2 in series with a resistor R1 bridged across condenser C1 which is employed to filter any voltage generated by the coils as the result of mechanical shock received thereby. By applying the input signal to the primary winding P of transformer T through the periodically operating contacts 130, the charge stored on condenser C2 is applied suddenly to the primary winding of the transformer T as the contacts 130 are brought into engagement with each other and the low frequency gradient signal generated by the coils L1 and L2 is thus modulated by the contacts 130 to voltage impulses having relatively high frequency characteristics suitable for amplification by the signal amplifying mechanism.

As the diaphragm 157 of the hydrostat mechanism moves inward by the pressure of the water within the chamber 175 the contact member 155 moves into engagement with contact spring 171 thereby applying ground to the negative terminal of battery BA3 from whence the circuit in continued by way of positive terminal of battery BA3, conductor 225, filament of tube V2, conductor 226, filament of tube V1, conductor 227 and thence to ground. Battery is also applied by way of conductor 225, filament of tube V3, conductor 228, filament of tube V5, conductor 229 and thence to ground. As contact spring 171 is engaged by the contact element 155, a circuit is closed from the positive terminal of battery BA3 by way of conductor 225, filament of tube V4, conductor 229 and thence to ground, the circuit to the negative terminal of battery BA3 being completed by way of contact element 155, contact spring 171 and conductor 256. The tubes V1, V2, V3, V4 and V5 are thus caused to be activated by the heating of their respective filaments within a fractional part of a second after contact element 155 has engaged contact spring 171.

As the flexible diaphragm 157 of the hydrostat continues its movement inward in response to an increase in the pressure of the water within the chamber 175, the contact element 155 continues to move inward and engage the contact spring 172. When this occurs the resistance element R17 is shorted by the contact spring 172 and contact element 155 thereby decreasing the resistance of the firing circuit to the detonator D by an amount equal to the resistance of the element R17. The resistance R17 is sufficiently high in value to prevent the operation of the detonator D in the event that the firing relay FR should have the contacts thereof closed prematurely as the result of a mechanical impulse or shock, or for any other reason, and thus by employing a resistance R17 in the manner shown on the drawing an arrangement is provided in which the operation of the detonator D is prevented until the pair of contacts 130 have been set into operation, tubes V1 to V5 have been energized and the signal amplifier and countermine devices are ready for operation by a gradient signal or by a countermining operation, as the case may be.

The secondary winding S of the transformer T is connected to ground at one end thereof and connected at the other end by way of condenser C3 to the grid control element of the vacuum tube V1, a resistance R2 being connected between the grid of the tube V1 and ground thereby to bias the grid of the tube V1 to a suitable initial potential. A condenser C4 is connected preferably across the secondary winding of the transformer T thereby to provide an arrangement in which the output signal from the transformer is substantially symetrical with respect to an input signal of either polarity applied thereto and, furthermore, to provide an arrangement in which there is less damping of the output signal from the transformer.

The tubes V1 and V2, it will be noted, are preferably of the pentode type in which the screen element thereof is maintained at a suitable potential by reason of the provision of resistances R3 and R4 respectively connected thereto. The bypass condensers C5 and C6 are employed to maintain the screen grids of the tubes V1 and V2 respectively at ground potential for alternating current. The plate or anode voltage of the tubes V1 and V2 is obtained from a battery BA2 by way of conductor 231 and suitable resistances R5 and R6 associated with the anodes of the tubes V1 and V2 respectively, the battery BA2 also supplying the screen grid voltage for these tubes through resistances R3 and R4. The anode of the tube V1 is connected to the grid of tube V2 by way of condenser C7, a potentiometer or amplification control element R7 being employed to control the variation in the potential applied to the grid of the tube V2 in response to a predetermined change in the potential of the anode of tube V1, one terminal of the element R7 being connected to ground.

The plate element of tube V2 is connected by way of condenser C8 to the grid of the tube V3, the grid of tube V3 being normally maintained at the predetermined negative potential of battery BA1 by reason of the resistance R8 connected therebetween as by the conductor 232 when no signal is received from the tube V2. This potential on the grid of tube V3 normally maintains the condition of the tube such that substantially no current flows in the plate circuit thereof.

The plate or anode element of the tube V3 has a potential applied thereto by battery BA2, the circuit including conductor 233, resistance R9, conductor 234, resistance R10, conductor 235, winding of the firing relay FR and conductor 236. A condenser C9 having one element thereof connected to ground is connected to conductor 234 intermediate the resistance elements R9 and R10. From the foregoing it will be apparent that the condenser C9 is normally charged to the potential of battery BA2.

As the depth charge travels downward into sufficient close proximity with respect to the submarine, the gradient signal received by the coils L1 and L2 increases until the depth charge has reached a position adjacent to the submarine at which time the gradient signal is of sufficient strength to cause the tube V3 to fire. When this occurs the condenser C9 is discharged through resistance R10 and the winding of the firing relay FR, the circuit being completed by way of conductor 236 through the plate element of the tube V3. The condenser C9 is of sufficient capacity and the resistance R10 is of an order of magnitude adapted to cause a flow of current as condenser C9 discharges of sufficient strength and duration to operate the firing relay FR. As armature 237 of relay FR engages its make contact a circuit is closed from positive terminal of battery BA1 by way of conductor 244, contact elements 172 and 155 of the hydrostat switch, conductor 243, detonator D, conductor 242, make contact and armature 237 of relay FR, conductor 241, contact springs 239 and 238 of the test jack 194, conductor 232 and thence to the negative terminal of battery BA1 thereby causing detonator D to operate and fire the depth charge adjacent the submarine.

The condenser C10 is connected preferably between the plate element of the tube V3 and the ground connection to the filament thereof thereby to insure that the tube V3 is extinguished when the condenser C9 is discharged. This connection for extinguishing the tube V3 is desirable in connection with testing the operation of the system prior to the launching of the depth charge within a body of water.

In the event that the path of travel of the depth charge within the water was sufficiently far removed from the submarine to prevent destruction or damage of the submarine by the depth charge, the gradient signal received by the gradiometer coils L1 and L2 would not be sufficiently strong to cause tube V3 to fire and the depth charge would, therefore, continue to travel downward beyond the submarine. When the depth charge has reached a predetermined period of submersion within the water the pistol mechanism within the casing 202 is actuated by the hydrostat element thereof sufficiently to explode the depth charge.

The operation of the system in response to a wave of hydrostatic pressure such, for example, as may be received as the result of an explosion of another depth charge within the vicinity of the device will now be described. When this occurs the control elements of the tube V4 are vibrated sufficiently to vary the potential across the condenser C11 connected to the plate element thereof and thereby increase the grid potential of the tube V5 and cause the tube V5 to fire. The wave of hydrostaic pressure may also cause a voltage to be generated within the amplifier sufficient to fire the tube V3 substantially in coincidence with the firing of the tube V5. The firing relay FR is of the type in which the closure of the relay contacts is in time delayed relationship with respect to the energization of the relay winding and for this reason the charge on the condenser C9 is dissipated by the firing of tube V5 before the contacts of relay FR have moved to closed position. As tube V5 fires, the condenser C9 is discharged over a circuit including conductor 234 and resistance R11. The subsequent operation of the tube V3 is thereby rendered ineffective to operate the firing relay FR until the condenser C9 is again in a charged condition. The tube V5, in causing the condenser C9 to discharge also reduces the voltage at the plate element of the tubes V5 and V3 to a value below the discharge sustaining potential of the tubes and the tubes V5 and V3 are, therefore, extinguished and the energizing current for the relay FR is interrupted. When this occurs the condenser C9 again charges through resistance R9 substantially to the potential of battery BA2. In the event that a second countermining shock should be received during the time condenser C9 is charging or the same hydrostatic impulse continues for this period of time, the tube V5 is again fired and the foregoing cycle of operations is repeated.

In the event, however, that the tube V5 is not fired as the result of a shock or impulse of hydrostatic pressure received through the water and the depth charge travels sufficiently close to the submerged submarine, the firing of the tube V3 in response to the gradient signal received from the pickup coils L1 and L2 causes the firing relay FR to operate and explode the depth charge.

Electrical surges as the result of mechanical disturbances received by the pickup coils L1, L2, L3, L4, the transformer T and the tube V1 insufficient to operate the microphonic tube V4 mechanically are prevented from causing the operation of relay FR sufficiently to close the contacts thereof by reason of a voltage divider circuit interconnecting the grid element of tube V2 with the grid element of tube V4, the circuit therebetween including a resistance R13, the electrical surge or signal being of greater amplitude than the gradient signal required to fire the tube V3. The grid element of tube V4, it will be noted, is connected to ground by way of resistance R14 and conductor 229. The plate or anode element of tube V4 is connected to the grid element of tube V5 by way of condenser C11, the grid of tube V5 also being connected to a source of negative potential at battery BA1 by way of resistance R12. The plate potential of the tube V4 is supplied from battery BA2 by way of conductor 233 and resistance R16, the resistance R15 being employed for maintaining a predetermined bias on the screen grid element of the tube V4 when the tube is in a state of rest and no signals are applied to the grid control element thereof. The bypass condenser C12 is employed for maintaining the screen grid of the tube V4 at ground potential for alternating current.

The several battery voltages may be tested by removing the plug 197, Fig. 4, from the cap 82 and inserting the test plug 245 into the test jack 194. Connected to the plug are a plurality of indicating devices or instruments 246, 247 and 248 by means of which the condition of the battery within the battery case 99 may be tested after the mechanism has been assembled within the casing of the depth charge. As the plug 245 enters the jack 194 a circuit is closed to ground by way of indicating instrument 246, conductor 249, plug terminal 251, sleeve contact 252 of jack 194, conductor 232, negative terminal of battery BA1 from whence the circuit is continued by way of the positive terminal of battery BA1 and resistance R17 to ground, the condition of the battery BA1 being thus ascertained by the indicating device 246. A circuit is also closed from ground at the indicating instrument 247, by way of conductor 253, contact 254 of plug 251, contact element 265 of jack 194, conductor 225, positive terminal of battery BA3, from whence the circuit is continued by way of the negative terminal of battery BA3, conductor 256 to the contact spring 171 of the hydrostat switch. No signal indication is given by the instrument 247 for the reason that contact spring 171 is disengaged from the contact element 155 of the hydrostat switch.

The flexible diaphragm 157, Fig. 7, may now be moved inward either by fluid pressure introduced within the chamber 175 or by a suitable tool inserted within the tapped hole of the cap 82 after the plug 176 is removed therefrom thereby to cause the element 155 to be brought into engagement with the contact spring 171 and connect the negative terminal of battery BA3 to ground. The condition of the battery BA3 is now made manifest by the indicating device 247. As the plug 245 is inserted into the jack 194 the contact spring 238 is disengaged from contact spring 239 thereby interrupting the circuit to armature 237 of the firing relay FR and preventing any possibility of prematurely firing the detonator D as the result of the operation of relay FR.

The closure of switch SW completes a circuit from ground by way of indicating device 248, conductor 258, switch SW, conductor 259, plug contact member 261, jack contact element 262, conductor 263, battery BA2 and thence to ground. The condition of the battery BA2 may thus be ascertained by the indication of the instrument 248 while the switch SW is in the closed position.

While the invention has been described in detail with respect to a specific example thereof which gives satisfactory results, it will be understood by those skilled in the art, after understanding the invention, that various changes and modifications may be made without departing from the spirit and the scope of the invention, and it is intended, therefore, in the appended claims to cover all such changes and modifications.

The invention herein described and claimed may be manufactured and used by and for the Government of the United States of America for governmental purposes without payment of any royalties thereon or therefor.

What is claimed as new and desired to be secured by Letters Patent of the United States is:

1. A depth charge adapted to be launched within a body of water, a casing for said depth charge, a pair of induction pickup coils arranged within said casing and adapted to generate electrical signals variably in accordance with the gradient of the magnetic field within which the coils are moved, a normally inactive signal amplifying device adapted to be controlled by said electrical signals, a source of electrical power, means responsive to the pressure of the water within which the depth charge is launched for causing said signal amplifying device to be activated by said source of electrical power, and means controlled by the signal amplifying device for exploding said depth charge in response to a signal of predetermined strength received from said pair of induction pickup coils.

2. A firing mechanism for a depth charge having means for generating a low frequency signal in accordance with a relatively slow change in the magnetic field detected thereby as the depth charge sinks within the water, means for converting said low frequency signal to signals of higher frequency, a signal amplifier adapted to be controlled by the converted signals, and means including an electro-responsive device controlled by said amplifier for firing said depth charge selectively in accordance with a predetermined rate of change of said magnetic field traversed by the depth charge.

3. A device of the character disclosed for firing a depth charge comprising a pair of oppositely connected induction pickup coils arranged in predetermined space relation with respect to each other, means settable at will for balancing said coils sufficiently to prevent the generation of an electrical signal thereby as the coils are moved within a uniform magnetic field, a capacitor element connected across said pair of coils, an input transformer, means for operatively connecting the primary of said transformer to said induction pickup coils periodically at predetermined intervals of time, a signal amplifying device having a control element thereof operatively connected to the secondary winding of said transformer, an electrical relay connected to the output of said signal amplifying device and adapted to be operated selectively in accordance with a predetermined electrical signal received from said pickup coils, said relay having a pair of normally open contacts adapted to be closed as the relay operates, and means including a detonating device controlled by said relay contacts adapted to explode the depth charge.

4. In a device of the character disclosed for firing a depth charge selectively in accordance with the gradient of the magnetic field within the path of travel of the depth charge, means including a pair of oppositely connected induction coils for detecting said gradient of the magnetic field and generating electrical signals proportional thereto, means for amplifying said electrical signals, means including an electro-responsive device controlled by said signal amplifying means adapted to fire said depth charge, and means responsive to impulses received through the water for preventing the operation of said firing means by said signal amplifying means until the impulses have subsided.

5. A depth charge adapted to be launched within a body of water, a casing for said depth charge, a gradiometer device arranged within said casing and adapted to generate electrical signals variably in accordance with the gradient of the magnetic field within which the gradiometer device is moved, normally locked means adapted to modulate said electrical signals to voltage impulses varying in strength in accordance with the strength of said electrical signals and of higher frequency than the frequency of the electrical signals, a normally inactive signal amplifying device adapted to be controlled by siad voltage impulses, means responsive to the pressure of the water within which the depth charge is launched for releasing said normally locked means, a source of electrical power, means controlled by said pressure responsive means for causing said signal amplifying device to be activated by said source of electrical power, and means controlled by the signal amplifying device for exploding said depth charge when the modulated voltage impulses have reached a predetermined degree of strength.

6. A firing mechanism for a depth charge having means for generating gradient signals in accordance with relatively slow changes in the magnetic field adjacent thereto as the depth charge sinks within the water, means for storing said gradient signals, a signal amplifying device, means including an impulse mechanism for applying the stored gradient signals by increments to the input of said signal amplifying device, and means including an electro-responsive device controlled by said signal amplifying device adapted to fire said depth charge when the increments of said gradient signals applied to said signal amplifying device have reached a predetermined order of magnitude.

7. In a device of the character disclosed for firing a depth charge selectively in accordance with the gradient of a non-uniform magnetic field within the path of travel of the depth charge, means including a pair of opposedly connected induction coils for detecting the gradient of said non-uniform magnetic field and generating electrical signals proportional thereto, a plurality of means for balancing said pair of induction coils electrically and magnetically when the coils are moved angularly within a uniform magnetic field, means for amplifying said electrical signals, means for applying said electrical signals in succession to said amplifying means, a firing circuit, and electro-responsive means controlled by said signal amplifying means for closing said firing circuit when the amplified signals have reached a predetermined degree of strength.

8. In a device of the character disclosed for firing a depth charge selectively in accordance with the gradient of a non-uniform magnetic field within the path of travel of the depth charge, means including a pair of opposedly connected induction coils for detecting the gradient of said non-uniform magnetic field and generating electrical signals proportional thereto, a pair of rods of magnetic material respectively arranged within said induction coils, means settable at will for controlling the eddy currents set up within said rods sufficiently to prevent the generation of an electrical signal thereby as the coils are moved angularly in any direction within a uniform magnetic field, a signal amplifying device, means for applying electrical signals received from said pair of induction coils to said signal amplifying device at predetermined intervals of time during the travel of the depth charge within said non-uniform magnetic field, and means including an electro-responsive device controlled by said signal amplifying device for firing the depth charge when the signals received from said pair of induction coils have reached a predetermined degree of strength.

9. A firing mechanism for a depth charge having a pair of opposedly connected induction pickup coils adapted to generate gradient signals in accordance with relatively slow changes in the magnetic field adjacent thereto as the depth charge sinks within a body of water, pair of rods of magnetic material respectively arranged in predetermined space relation within each of said pickup coils, an annular electrical conducting device arranged about one of said rods adapted to control the phase of the magnetic flux flowing within the rod as the depth charge moves through a uniform magnetic field, a coil of wire arranged about the other of said rods, means settable at will in operative connection with the ends of said coil of wire for controlling the flow of electrical current therein sufficiently to bring the eddy currents within said other of the rods to equality with respect to the eddy currents flowing within said one of the rods, means including a plurality of induction coils intermediate said pair of rods and operatively connected to said induction pickup coils for preventing the generation of an electrical signal by the pickup coils as the depth charge is moved in any direction within a uniform magnetic field, means for amplifying the gradient signal generated by said pair of pickup coils as the depth charge moves within a non-uniform magnetic field, a firing relay controlled by said signal amplifying means, and means including a detonating device adapted to be fired by said firing relay when the amplified gradient signal has reached a predetermined degree of strength.

10. In a device of the character disclosed for firing a depth charge selectively in accordance with variations in the magnetic field within which the depth charge moves, the combination of a signal amplifier, a gradiometer device operatively connected to the input of said signal amplifier, a normally charged condenser connected to the output of said signal amplifier and adapted to be discharged by the amplifier when the input signal thereto from said gradiometer device has reached a predetermined degree of strength, a firing relay adapted to be operated by current from said condenser as the condenser is discharged, and electro-responsive means controlled by said firing relay for firing the depth charge as the firing relay operates.

11. In a depth charge of the character disclosed adapted to be fired by the gradient of the magnetic field within which the charge is moved, a casing for said depth charge, means including a pair of gradiometer coils adapted to generate electrical signals variably in accordance with said gradient of the magnetic field, a signal amplifier comprising a pair of signal amplifying tubes and an output tube adapted to be fired thereby, a condenser operatively connected to said output tube, a source of electrical power, means for normally maintaining the condenser charged by said source of electrical power, a discharge circuit for said condenser adapted to be closed by said output tube as the output tube fires, a firing relay included within said discharge circuit and adapted to be operated by current from said condenser, a second discharge circuit for said condenser, and means including a thermionic tube operatively connected to said pair of signal amplifying tubes for causing the condenser to be discharged over said second discharge circuit in response to a signal of predetermined character received by the signal amplifier adapted to fire said output tube thereby to prevent the operation of the firing relay as the output tube fires.

12. A depth charge adapted to be launched within a body of water, a casing for said depth charge, a hydrostat device secured to said casing adapted to be actuated variably in accordance with the pressure of the water adjacent thereto, a normally locked self-operating impulse mechanism, means controlled by said hydrostat device for releasing the impulse mechanism for operation, a source of electrical power, a signal amplifier comprising a plurality of thermionic tubes, a pair of contacts adapted to be closed by said hydrostat device for causing said plurality of thermionic tubes to be activated by said source of electrical power, a gradiometer adapted to generate electrical signals variably in accordance with variations in the magnetic field within the path of travel of the depth charge, means for storing said signals, means controlled by said impulse mechanism for applying the stored signals in succession to said signal amplifier, a detonating device, a firing circuit for said detonating device including an element having sufficiently high resistance to render said firing circuit normally ineffective to fire the detonating device, a second pair of contacts controlled by said hydrostat adapted to shunt said high resistance element when the depth charge has descended to a predetermined depth of submersion within the water, and means responsive to signals received from said signal amplifier during the time the high resistance element is shunted for causing the detonating device to be fired by said firing circuit when the stored signals have reached a predetermined degree of strength.

13. A depth charge of the character disclosed adapted to be fired by gradient signals, a casing for said depth charge, a pair of tubular members arranged within said casing, a pair of opposedly connected balanced induction pickup coils disposed within said tubular members respectively and adapted to generate gradient signals variably in accordance with changes in the magnetic field detected thereby as the depth charge sinks within a body of water, a pair of rods of magnetic material respectively arranged within said induction pickup coils, means for yieldably supporting said magnetic rods respectively within said tubular members in predetermined space relation with respect to each other, a plurality of devices respectively arranged within each of said tubular members and settable at will for adjusting the balance of said pickup coils, means for amplifying the gradient signals generated by said pickup coils as the depth charge moves within a non-uniform magnetic field, an explosive charge disposed within said casing, and means controlled by said signal amplifying means for firing said explosive charge when the gradient signals have reached a predetermined degree of strength.

14. A depth charge adapted to be launched within a body of water, a casing for said depth charge, a pair of opposedly connected pickup coils arranged in predetermined space relation with respect to each other within said casing and adapted to generate signals variably in accordance with the gradient of a non-uniform field through which the coils move, means for balancing said pickup coils sufficiently to prevent the generation of an electrical signals thereby as the coils are moved in any direction within a uniform magnetic field, means for storing said gradient signals, an input transformer, means for applying the stored gradient signals singly in succession to said input transformer at predetermined intervals of time during the descent of the depth charge within the water, a signal amplifier operatively connected to said input transformer and adapted to be controlled thereby, means for detonating said depth charge, and electro-responsive means adapted to fire said detonating means when the stored signals applied to said input transformer have reached a predetermined degree of strength.

15. In a device of the character disclosed for firing a depth charge selectively in accordance with variations in the magnetic field within which the depth charge moves, the combination of a signal amplifier having a gradiometer device operatively connected to the input thereof, a gas discharge tube connected to the output of said signal amplifier, a source of electrical potential, a load circuit connecting the anode of said gas discharge tube with said source of electrical potential, said load circuit having a pair of resistance elements included therein, a normally charged capacitance device operatively connected to said load circuit intermediate said pair of resistance elements and in electrical connection with the cathode of said gas discharge tube whereby the capacitance device is adapted to be discharged as the gas discharge tube fires in response to an input signal of predetermined character received from said gradiometer device, and a second capacitance device in electrical connection with the anode and cathode of said gas discharge tube adapted to extinguish the gas discharge tube when the first named capacitance device is discharged.

16. A depth charge of the character disclosed adapted to be launched within a body of water, a casing for said depth charge, a tubular member arranged within said casing, an electro-responsive detonating device, means secured to one end of said tubular member in sealed relation thereto for supporting said detonating device therein, a cap adapted to seal the opposite end of said tubular member, a firing control mechanism including a signal amplifier arranged within the tubular member and supported by said cap, a source of electrical power detachably secured to said firing control mechanism, a firing relay controlled by said signal amplifier and having circuit closing means adapted to cause the detonating device to be operated by said source of electrical power as the relay operates, means responsive to the gradient of the magnetic field within which the depth charge travels for generating electrical signals, means for applying said electrical signals in succession to the signal amplifier at predetermined intervals of time, means including a group of slip connections for establishing a plurality of electrical circuits between said source of electrical power and the signal amplifier means including a second group of slip connections for establishing a control circuit between the electrical signal generating means and the input of said signal amplifier, and means including a third group of slip connections for operatively connecting the circuit closing means of said firing relay to said detonating device.

17. A depth charge adapted to be launched within a body of water, means for generating electrical signals variably in accordance with the gradient of the magnetic field through which the depth charge travels, means including a plurality of vacuum tubes for amplifying said electrical signals, an electrical relay controlled by said signal amplifying means and having a pair of contacts adapted to be closed as the relay operates, a source of electrical power, an electro-responsive detonating device adapted to be fired by said source of electrical power as the pair of contacts are closed, a test jack having a plurality of contact elements electrically connected to said source of power, a test circuit having a plug connected thereto adapted to be inserted within said test jack, and a pair of contact elements included within said test jack adapted to disconnect the contacts of said relay from said source of electrical power as the plug is inserted therein.

18. A firing control system of the character disclosed comprising, in combination, a normally charged condenser, a plurality of discharge paths for said condenser, a firing circuit, delayed action electro-responsive means included in one of said discharge paths for controlling the operation of said firing circuit, means including means responsive to changes in a magnetic field for causing said condenser to discharge through said one of said discharge paths, means including a microphonic device operable upon vibration thereof for causing said condenser to discharge through another of said discharge paths as pressure impulses are received by said depth charge, and circuit means including said delayed action means for preventing the operation of said firing circuit when said pressure impulses and said magnetic changes occur simultaneously.

References Cited in the file of this patent

UNITED STATES PATENTS

| | | |
|---|---|---|
| 542,732 | Huskisson | July 16, 1895 |
| 1,290,125 | Downs | Jan. 7, 1919 |
| 1,310,586 | Straub et al. | July 22, 1919 |
| 1,379,972 | Fiske | May 31, 1921 |
| 1,382,374 | Maxim | July 21, 1921 |
| 1,407,653 | Hammond | Feb. 21, 1922 |
| 2,252,059 | Barth | Aug. 12, 1941 |
| 2,341,351 | Barkley | Feb. 8, 1944 |
| 2,379,447 | Lindsey | July 3, 1945 |
| 2,406,870 | Bacquier | Sept. 3, 1946 |